United States Patent [19]
Guimbretiere

[11] Patent Number: 5,772,517
[45] Date of Patent: Jun. 30, 1998

[54] TRANSMISSION JOINT HAVING A TRIPOD ELEMENT, THE ARMS OF THE TRIPOD ELEMENT HAVING SPHERICAL SURFACES ON AXES OFFSET FROM RADII OF THE TRIPOD ELEMENT

[75] Inventor: Pierre Louis Guimbretiere, Neauphle-le-Chateau, France

[73] Assignee: GKN Automotive AG, Lohmar, Germany

[21] Appl. No.: 604,012

[22] Filed: Feb. 20, 1996

[30]   Foreign Application Priority Data

Feb. 17, 1995  [FR]   France ................................... 95 01879

[51] Int. Cl.⁶ ....................................................... F16D 3/20
[52] U.S. Cl. ........................... 464/111; 464/167; 464/905
[58] Field of Search .................................. 464/111, 120, 464/122, 167, 905, 123, 124

[56]                References Cited

U.S. PATENT DOCUMENTS

| | | |
|---|---|---|
| 2,559,108 | 7/1951 | Boge, Sr. et al. . |
| 2,898,749 | 10/1959 | Parkman . |
| 3,381,497 | 5/1968 | Allen . |
| 3,478,538 | 11/1969 | Heimler . |
| 4,291,552 | 9/1981 | Orain . |
| 4,582,501 | 4/1986 | Gibbons . |
| 4,582,502 | 4/1986 | Girguis . |
| 4,741,723 | 5/1988 | Orain . |
| 4,828,534 | 5/1989 | Orain ................................... 464/167 X |
| 4,878,881 | 11/1989 | Van Dest ............................... 464/111 |
| 4,881,923 | 11/1989 | Orain . |
| 4,954,120 | 9/1990 | Kobayashi . |
| 4,988,327 | 1/1991 | Orain . |
| 5,019,016 | 5/1991 | Uchman . |
| 5,061,223 | 10/1991 | Kadota et al. . |
| 5,135,438 | 8/1992 | Poulin et al. ........................... 464/111 |
| 5,184,978 | 2/1993 | Fillmore . |
| 5,254,038 | 10/1993 | Schneider . |
| 5,290,202 | 3/1994 | Orain . |

FOREIGN PATENT DOCUMENTS

| | | |
|---|---|---|
| 206 886 | 6/1986 | European Pat. Off. . |
| 0 429 326 A1 | 10/1990 | European Pat. Off. . |
| 0 477 074 A1 | 9/1991 | European Pat. Off. . |
| 1 012 081 | 7/1952 | France . |
| 2 506 872 | 6/1981 | France . |
| 2 512 140 | 3/1983 | France . |
| 2 592 106 | 12/1986 | France . |
| 2 622 653 | 5/1989 | France . |
| 2 628 803 | 9/1989 | France . |
| 23 31 033 | 1/1975 | Germany . |
| 44 10 724 A1 | 3/1994 | Germany . |
| 61-266830 | 11/1986 | Japan ..................................... 464/111 |
| 63-92822 | 4/1988 | Japan . |
| 3-168416 | 7/1991 | Japan . |
| 5-321942 | 12/1993 | Japan . |
| 2106219 | 4/1983 | United Kingdom ................... 464/111 |
| 2 199 113 | 6/1988 | United Kingdom . |
| 2 210 952 | 6/1989 | United Kingdom . |
| 2 236 164 | 3/1991 | United Kingdom . |
| WO91/16549 | 10/1991 | WIPO . |
| WO 92/15797 | 9/1992 | WIPO . |

*Primary Examiner*—Eileen A. Dunn
*Attorney, Agent, or Firm*—Wenderoth, Lind & Ponack

[57]                ABSTRACT

A slidable transmission joint has guides which ensure the cooperation of each arm (6) of a tripod element with associated tracks (7, 8). The guides have different overall sizes in the two circumferential directions. A spherical surface (3A) associated with each arm has an axis (Y—Y) which is parallel to a radius (13) of the male element (1) and perpendicular to the straight line joining the center of the spherical surface (3A) to the center of the layer guide and is offset from this radius in a direction away from the larger guide.

26 Claims, 4 Drawing Sheets

5,772,517

TRANSMISSION JOINT HAVING A TRIPOD ELEMENT, THE ARMS OF THE TRIPOD ELEMENT HAVING SPHERICAL SURFACES ON AXES OFFSET FROM RADII OF THE TRIPOD ELEMENT

BACKGROUND OF THE INVENTION

The present invention relates to a slidable transmission joint of the type comprising a male element that is to be fixed to a first shaft. The male element has arms, each of which defines, directly of through the medium of a roller, a spherical surface. A female element to be fixed to a second shaft defines tracks, two of which are located on respective opposite sides of each arm. Two guide means for each arm ensure the cooperation of each arm with the two associated tracks.

SUMMARY OF THE INVENTION

An object of the invention is to obtain, for a given overall size of a joint, an increased torque-transmitting capacity during practically the whole of the life of the joint.

The invention therefore provides a transmission joint of the aforementioned type which two guide means of each arm have different overall sizes in the two circumferential directions. Further, a spherical surface associated with each arm has an axis which is parallel to the radius of the male element and perpendicular to a line joining the center of the spherical surface to the center of a larger of the two guide means. The axis is offset from the radius in a direction toward the side of the radius remote from the larger guide means.

The transmission joint according to the invention may further comprise one or more of the following features.

The thickness of the wall of the female element can be substantially the same at the radially outer edge of the two tracks.

One of the two guide means of each arm comprises, on the one hand, a bar, in particular a self-recentering bar, which defines on a side thereof adjacent the arm a spherical recess and on the opposite side at least one rolling ways and on the associated track, which is a groove.

One of the two guide means of each arm can comprise a shoe which is internally spherical and has a face remote from the arm which is planar and is movable on an associated track, which is a groove.

One of the two guide means of each arm can comprise a sector which is internally spherical and externally toric and which is rollable on the associated track, which is a groove.

On of the two guide means of each arm can comprise a ball which is cooperative with a first rolling groove provided on a side of the arm and with a second rolling groove constituting the associated track. The first rolling groove makes an angle with the second rolling groove.

The smaller guide means of each arm can comprise direct contact between the spherical surface defined by the arm and the associated track. The tracks have directrices parallel to the axis of the female element.

BRIEF DESCRIPTION OF THE DRAWINGS

Embodiments of the invention will now be described with reference to the accompanying drawings, in which.

DETAILED DESCRIPTION OF THE PREFERRED EMBODIMENTS

Figure 1:
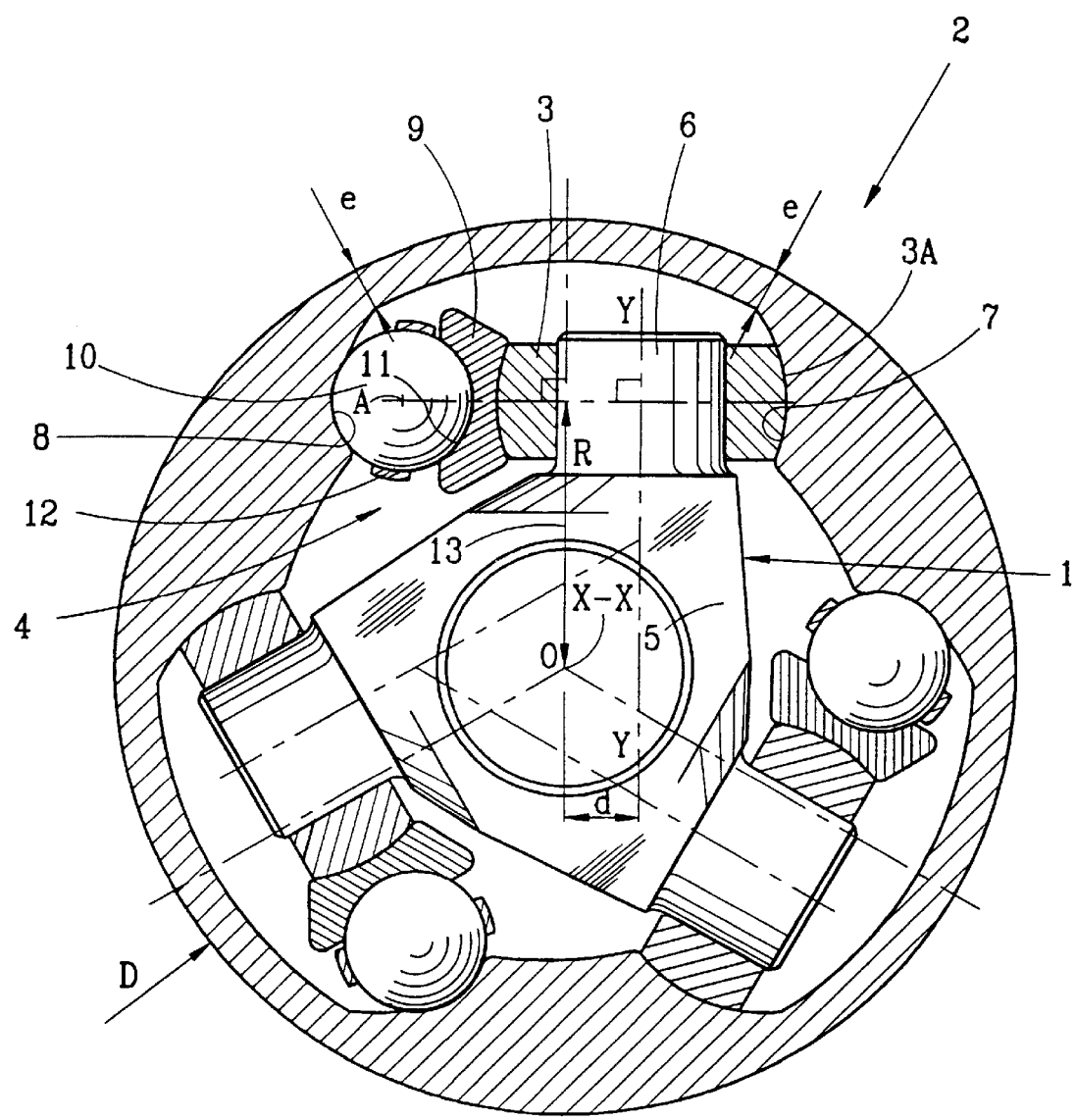
FIG. 1 is a cross-sectional view of a transmission joint according to the invention in an aligned position thereof.

The transmission joint shown in FIG. 1 is intended to interconnect two shafts (not shown) which are slidable relative to each other when they are either in mutual alignment or make an angle of flexion, which may typically reach about 25°. The joint comprises mainly a male element 1, or tripod element, a female element 2, or bell, three rollers 3 and three anti-vibration assemblies 4.

The tripod element is made in one piece and comprises a central hub 5 for fixing to one of the two shafts. Three arms 6, which are angularly evenly spaced apart, extend from hub 5. Each arm 6 is cylindrical with a circular section and carries a roller 3 which has a spherical outer surface 3A and is rotatively and slidably mounted on the arm.

The bell 2 is externally cylindrical, has a circular section, and defines, for each arm 6, a pair of confronting tracks 7 and 8. A first track 7 is formed by a cylindrical groove which has a circular section, has an axis parallel to the axis X—X of the bell, and substantially mates with the roller 3. A second track 8 is also formed by a cylindrical groove having an axis parallel to the axis X—X and has a circular section, but is of smaller radius.

The assembly 4 is such as that disclosed in the document FR-A02 628 803. It comprises a self-centering bar 9 and two balls 10. The bar 9 comprises internally a spherical recess substantially mating with the roller 3 and is cooperative with the roller 3. Externally are two rolling ways 11 having a circular section separated by a median projections (not shown in the drawing). The rolling ways 11, when seen in plan, are rectilinear and are extensions of each other. In a lateral view, they progressively move away from the track 8 the further they are from the median projection.

Each ball 10 is interposed between one of these rolling ways and the track 8. The shape of the two rolling ways 11 ensures a self-recentering of the two balls, as disclosed in document FR-A-2 628 803. The assembly 4 is completed by a ball-retaining cage 12.

In the cross-sectional view (FIG. 1), the axis Y—Y of each arm 6 is parallel to a radius 13 of the tripod element 1 which leads from the center 0 of the tripod element 1 and is perpendicular to the straight line joining the center of the surface 3A to the center A of the balls 10. Further, the axis Y—Y is offset a give distance d from the radius 13 toward the side remote from the assembly 4. The offset is such that adjacent the radially outer edges of the two tracks 7 and 8 the thickness e of the bell, measured radially, is substantially the same.

In service, the joint is mounted in a motor vehicle transmission in a manner such that, in forward travel of the vehicle, the motor torque is transmitted from the bell to the tripod element via the three assemblies 4. Under torque, a slight clearance appears on the side adjacent the tracks 7 so that the resistance to the sliding in substantially that defined by the assemblies 4, and is therefore very small, even when the joint operates in the flexed state. In other words, in forward travel, i.e. during practically the whole of the duration of operation of the joint, the level of the axial excitations transmitted by the joint to the structure of the vehicle is particularly low.

In rearward travel, it is the resistance to the rolling of the rollers 3 on the track 7 which defines the resistance to the sliding of the joint. This resistance is distinctly higher than that corresponding to the forward travel, but is acceptable, bearing in mind the very short duration of operation of the vehicle in rearward travel.

Further, the offset d of the axis Y—Y of the arm 6 from the radius 13 has as a result, for the given radial overall size of the joint (outside diameter D of the bell) and a given thickness e, a substantial increase in the capacity of the joint as compared with the case where the axis Y—Y coincides with the radius 13. The increase in the capacity of the joint obtained in this way may reach values on the order of 20%.

FIGS. 2–8 show other embodiments of the present invention. In these embodiments, similar reference numerals are used to show similar parts. They may be designated by a letter to reference their particular embodiment. Particular differences between the embodiments will be discussed in detail.

Figure 2:
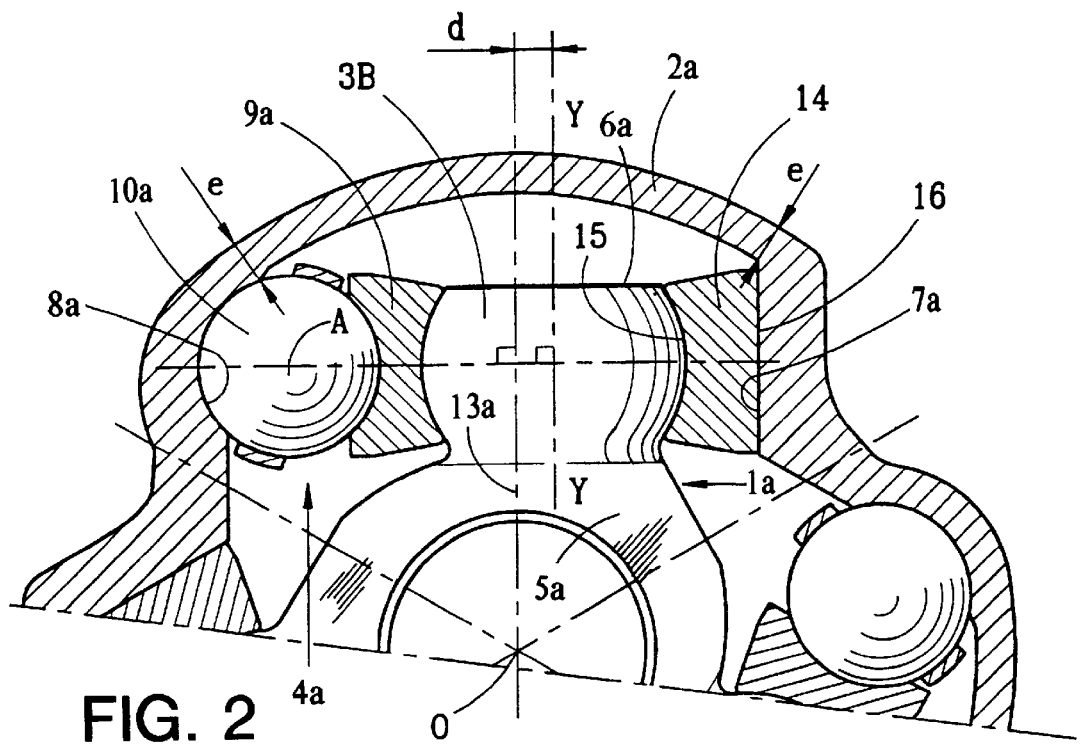
FIGS. 2 and 3 are partial cross-sectional views of another embodiment of the transmission joint according to the invention.

FIG. 2 shows the application of the invention to a transmission joint which differs from that of FIG. 1 in two aspects. The roller 3 is eliminated and arm 6*a* itself defines a spherical surface 3B integral with the arm. Further, on the side opposite to bar-balls 4*a*, a shoe 14 is added. This shoe defines a concave spherical inner surface 15 which cooperates with the surface 3B and a planar outer surface 16 which is directly slidable on track 7*a*, which is also planar.

In this embodiment, it is again in the direction away from the assembly 4*a* that the axis Y—Y of the arm is offset from radius 13*a*, and the torque is again transmitted in forward travel via the assemblies 4*a*. Advantages similar to those explained hereinbefore with reference to FIG. 1 are therefore obtained.

Further, it is clear from FIG. 2 that it is possible to economize the material of the female element 2 without increasing the overall size by reducing its thickness from the exterior in regions located between the arms of the tripod element 1.

Figure 3:
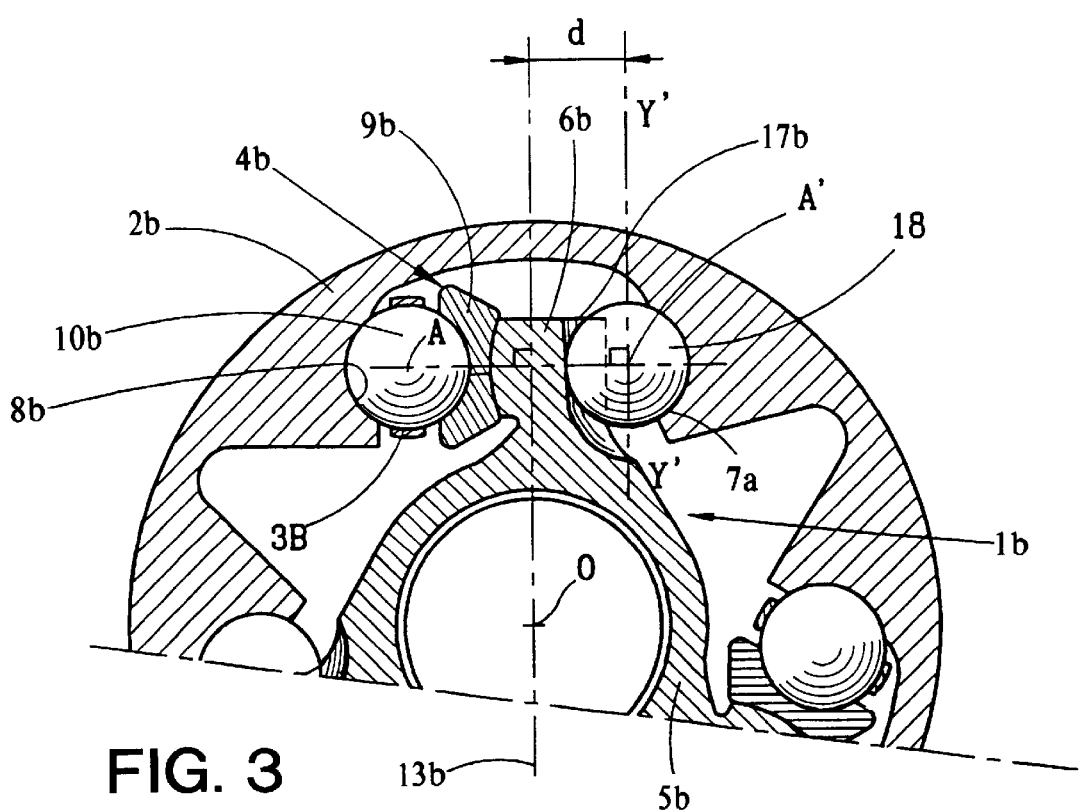

The transmission joint of FIG. 3 differs from the preceding joint in that, on the side remote from the assembly 4*b*, the arm 6*b* defines a rectilinear groove 17 having an axis Y'—Y' defined as before, with a circular section. The arm consequently has a channel shape. The track 7*b* is another rectilinear groove parallel to the axis of the bell with a circular section. A single ball 18 cooperates with the pair of grooves 7*b*, 17. Its center A' is situated at the center of the spherical surface 3B when the joint is in alignment.

Figure 4:
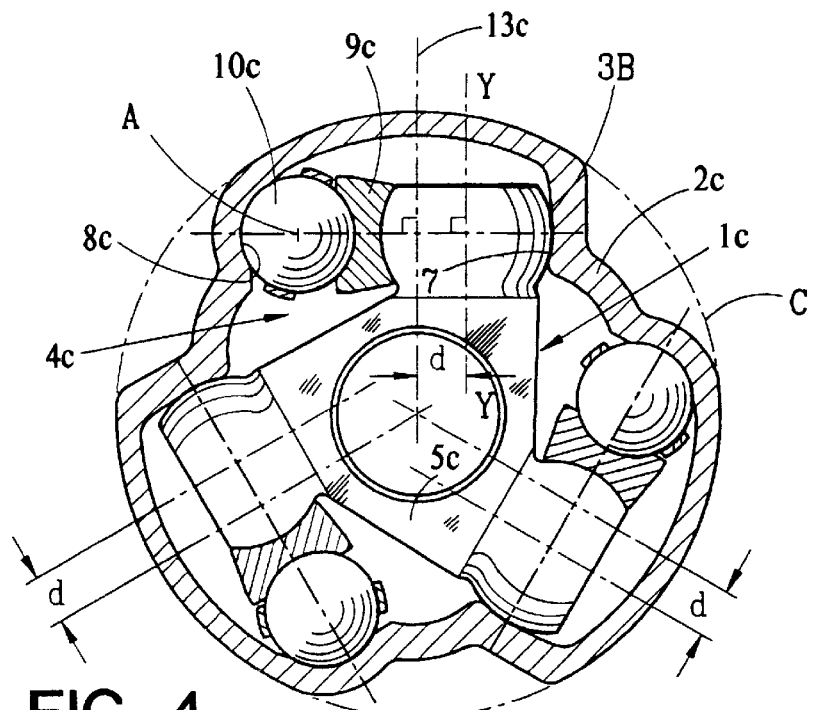
FIG. 4 is a cross-sectional view of another embodiment of the transmission joint according to the invention.

The transmission joint shown in FIG. 4 differs from that of FIG. 2 only by the fact that the shoe 14 is eliminated and the spherical surface 3B of the arm 6*c* is in direct contact with the track 7*c*. The track 7*c* is then cylindrical with a circular section and centered on the center of the balls 10*c*.

The transmission joint of FIG. 4 and FIG. 2, the surplus material of the bell has been eliminated between the arms of the tripod element so that the bell is formed by a tubular section member having a roughly constant thickness.

Figure 5:
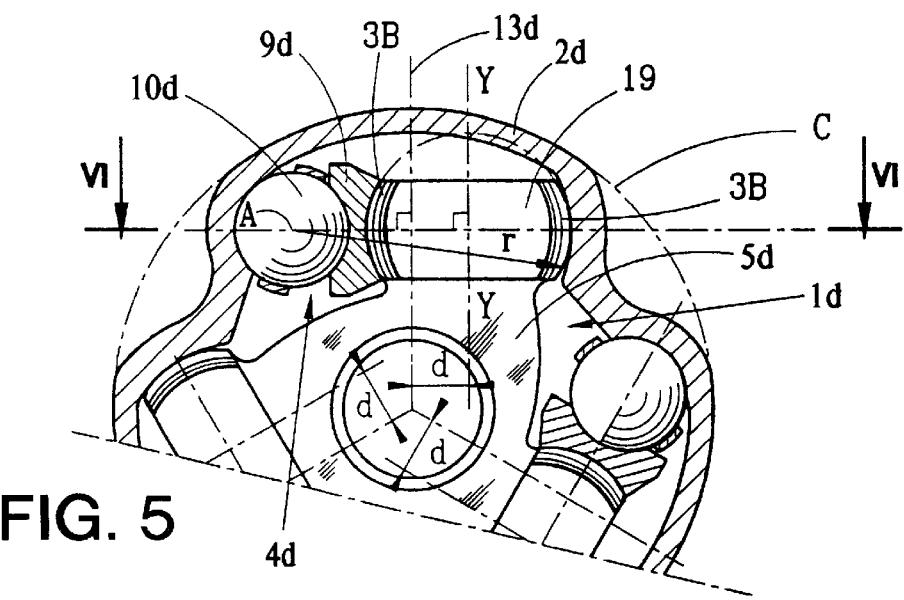
FIG. 5 is a partial cross-sectional view of another embodiment of the transmission joint according to the invention.
Figure 6:
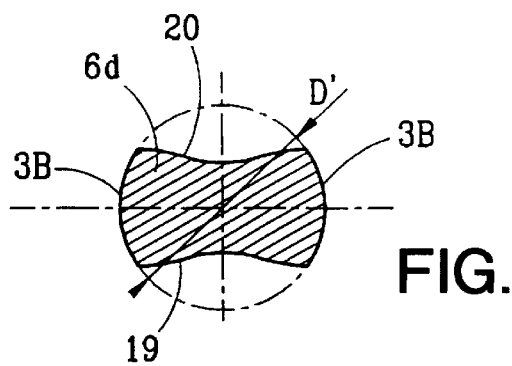
FIG. 6 is a partial sectional view taken on line VI—VI of FIG. 5.
Figure 7:
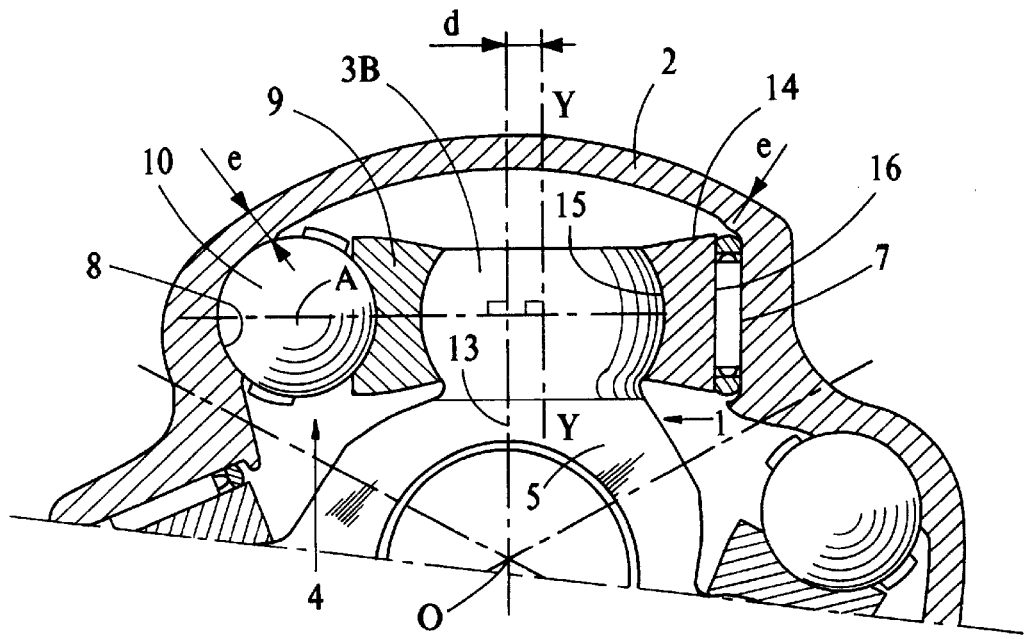
FIG. 7 is a partial sectional view similar to FIG. 2 showing a variation.
Figure 8:
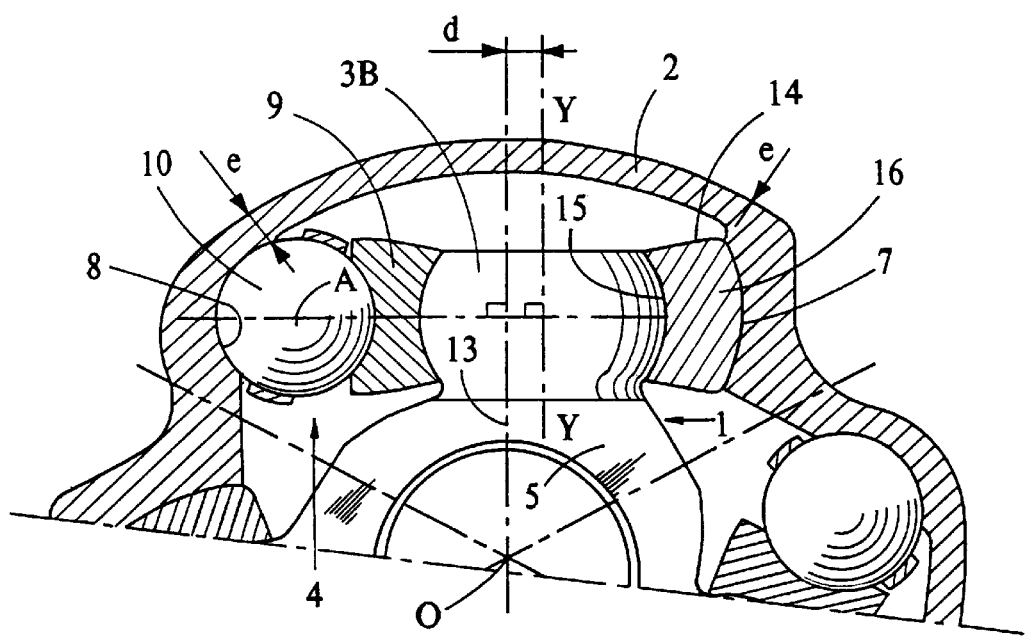
FIG. 8 is a partial sectional view similar to FIG. 2 showing another variation.

By increasing to a maximum the diameter D' of the spherical surface 3B while leaving the bell inscribed within the same outer circle C, the joint of FIGS. 5 and 6 is obtained, which is better balanced and permits obtaining reduced hertzian pressures on the surfaces in contact. In this case, in order to limit the overall axial size of the joint, the arms may be truncated by two surfaces 19, 20 roughly perpendicular to the axis of the tripod element, as is clearly shown in FIG. 6.

In all the embodiments, it is the dissymmetry of the joint with respect to the two directions of rotation which permits increasing the capacity to transmit the torque for a given overall size (or, of course, reducing the overall size for a given capacity) merely by offsetting the axis Y—Y of the spherical surface 3A or 3B to the center of the assembly 4 of the larger size, in the direction away from the larger arm guide means.

In all the foregoing embodiments, the bar-balls assembly 4 is a larger side means, and an opposite guide means is either direct contact (1, 4, 5), or is a shoe having a planar face (FIG. 2), or a ball cooperative with two grooves which intersect (FIG. 3). However, with the same assembly 4, the opposite guide means may be formed by other elements (not shown) smaller than the assembly 4 and known per se: a sector 14*f* which is internally spherical for cooperation with the surface 3A or 3B and externally toric for cooperation with a groove 7 with a circular section (FIG. 8); a shoe 14*e* similar to the shoe 14 with a row of needles parallel to the axis Y—Y, retained by a cage and interposed between a planar face 16*e* and a planar track 7*e* (FIG. 7); or a shoe similar to the shoe 14, the planar surface having a circular section and sliding and oscillating in a track 7 formed by a groove with a circular section.

In yet another alternative embodiment, other associations of guide means having different overall sizes may be suitable for carrying out the invention. Note that when the guide means of larger size is a shoe sliding on a planar track 7, such as the shoe 14 of FIG. 2, the center of this guide means is at an infinite distance away in the direction perpendicular to this planar track.

What is claimed is:

1. A transmission joint comprising:
   a male tripod element to be fixed to a first shaft, said male tripod element including arms, each arm of said arms comprising a spherical surface, said spherical surface having a center and an axis, and said male tripod element having a radius;
   a female element to be fixed to a second shaft, said female element defining a plurality of tracks such that each arm has two tracks of said plurality of tracks associated therewith, with one of said two tracks being disposed on each of two opposite sides of said arm; and
   a first guide means for each arm for ensuring cooperation of each arm with one of said two tracks associated therewith, said first guide means having a center, and a second guide means for each arm for ensuring cooperation of each arm with the other of said two tracks associated therewith, said first guide means being larger than said second guide means in a circumferential direction of said female element;
   wherein the axis of said spherical surface of each arm is parallel to the radius of said male tripod element, is perpendicular to a line extending through the center of said spherical surface and the center of said first guide means, and is offset from the radius of said male tripod element in a direction away from said first guide means.

2. The transmission joint of claim 1, wherein said spherical surface of each arm is provided directly on said arm.

3. The transmission joint of claim 2, wherein said second guide means comprises direct contact between said spherical surface of said arm and the other of said two tracks.

4. The transmission joint of claim 1, wherein said spherical surface of each arm is defined by a roller mounted on said arm.

5. The transmission joint of claim 4, wherein said roller is slidably and rotatably mounted on said arm.

6. The transmission joint of claim 1, wherein said female element has a wall having a thickness that is substantially the same adjacent each of radially outer edges of said two tracks associated with each arm.

7. The transmission joint of claim 1, wherein the one of said two tracks comprises a groove, and said first guide means comprises:
a bar having a spherical recess defined on a side thereof adjacent said arm and at least one rolling way having a circular section; and
at least two balls between and rollable on said at least one rolling way and the one of said two tracks.

8. The transmission joint of claim 7, wherein said at least one rolling way comprises two rolling ways having a center point therebetween, each of said two rolling ways diverging from said groove the further said two rolling ways are from said center point, each of said two rolling ways having at least one of said at least two balls thereon.

9. The transmission joint of claim 1, wherein one of said first and second guide means comprises a shoe having an internal spherical surface and a face facing away from said arm, said face being planar and in direct contact with one of said two tracks, and wherein the one of said two tracks is planar.

10. The transmission joint of claim 1, wherein one of said first and second guide means comprises a shoe having an internal spherical surface and a face facing away from said arm, said face being planar, wherein a row of needles is disposed between said face and one of said two tracks, and wherein the one of said two tracks is planar.

11. The transmission joint of claim 1, wherein one of said first and second guide means comprises a sector shaped member having an internal spherical surface and an external toric surface that is rollable on one of said two tracks, and wherein the one of said two tracks comprises a groove.

12. The transmission joint of claim 1, wherein one of said first and second guide means comprises a first rolling groove on one side of said arm, one of said two tracks being a second rolling groove, and a ball disposed between and cooperative with said first and second rolling grooves, and wherein said first and second rolling grooves form an angle with each other.

13. The transmission joint of claim 1, wherein said plurality of tracks have directrices parallel to the axis of said female element.

14. A transmission joint comprising:
a male tripod element to be fixed to a first shaft, said male tripod element including arms, each arm of said arms comprising a spherical surface, said spherical surface having a center and an axis, and said male tripod element having a radius;
a female element to be fixed to a second shaft, said female element defining a plurality of tracks such that each arm has two tracks of said plurality of tracks associated therewith, with one of said two tracks being disposed on each of two opposite sides of said arm; and
first guide structure for each arm between each arm and one of said two tracks associated therewith, said first guide structure having a center, and second guide structure for each arm between each arm and the other of said two tracks associated therewith, wherein said first guide structure is larger than said second guide structure in a circumferential direction of said female element;
wherein the axis of said spherical surface of each arm is parallel to the radius of said male tripod element, is perpendicular to a line extending through the center of said spherical surface and the center of said first guide structure, and is offset from the radius of said male tripod element in a direction away from said first guide structure.

15. The transmission joint of claim 14, wherein said spherical surface of each arm is provided directly on said arm.

16. The transmission joint of claim 15, wherein said second guide structure comprises direct contact between said spherical surface of said arm and the other of said two tracks.

17. The transmission joint of claim 14, wherein said spherical surface of each arm is defined by a roller mounted on said arm.

18. The transmission joint of claim 16, wherein said roller is slidably and rotatably mounted on said arm.

19. The transmission joint of claim 14, wherein said female element has a wall having a thickness that is substantially the same adjacent each of radially outer edges of said two tracks associated with each arm.

20. The transmission joint of claim 14, wherein the one of said two tracks comprises a groove, and said first guide structure comprises:
a bar having a spherical recess defined on a side thereof adjacent said arm and at least one rolling way having a circular section; and
at least two balls between and rollable on said at least one rolling way and the one of said two tracks.

21. The transmission joint of claim 20, wherein said at least one rolling way comprises two rolling ways having a center point therebetween, each of said two rolling ways diverging from said groove the further said two rolling ways are from said center point, each of said two rolling ways having at least one of said at least two balls thereon.

22. The transmission joint of claim 14, wherein one of said first and second guide structures comprises a shoe having an internal spherical surface and a face facing away from said arm, said face being planar and in direct contact with one of said two tracks, and wherein the one of said two tracks is planar.

23. The transmission joint of claim 14, wherein one of said first and second guide structures comprises a shoe having an internal spherical surface and a face facing away from said arm, said face being planar, wherein a row of needles is disposed between said face and one of said two tracks, and wherein the one of said two tracks is planar.

24. The transmission joint of claim 14, wherein one of said first and second guide structures comprises a sector shaped member having an internal spherical surface and an external toric surface that is rollable on one of said two tracks, and wherein the one of said two tracks comprises a groove.

25. The transmission joint of claim 14, wherein one of said first and second guide structures comprises a first rolling groove on one side of said arm, one of said two tracks being a second rolling groove, and a ball disposed between and cooperative with said first and second rolling grooves, and wherein said first and second rolling grooves form an angle with each other.

26. The transmission joint of claim 14, wherein said plurality of tracks have directrices parallel to the axis of said female element.

* * * * *